Figure 6:
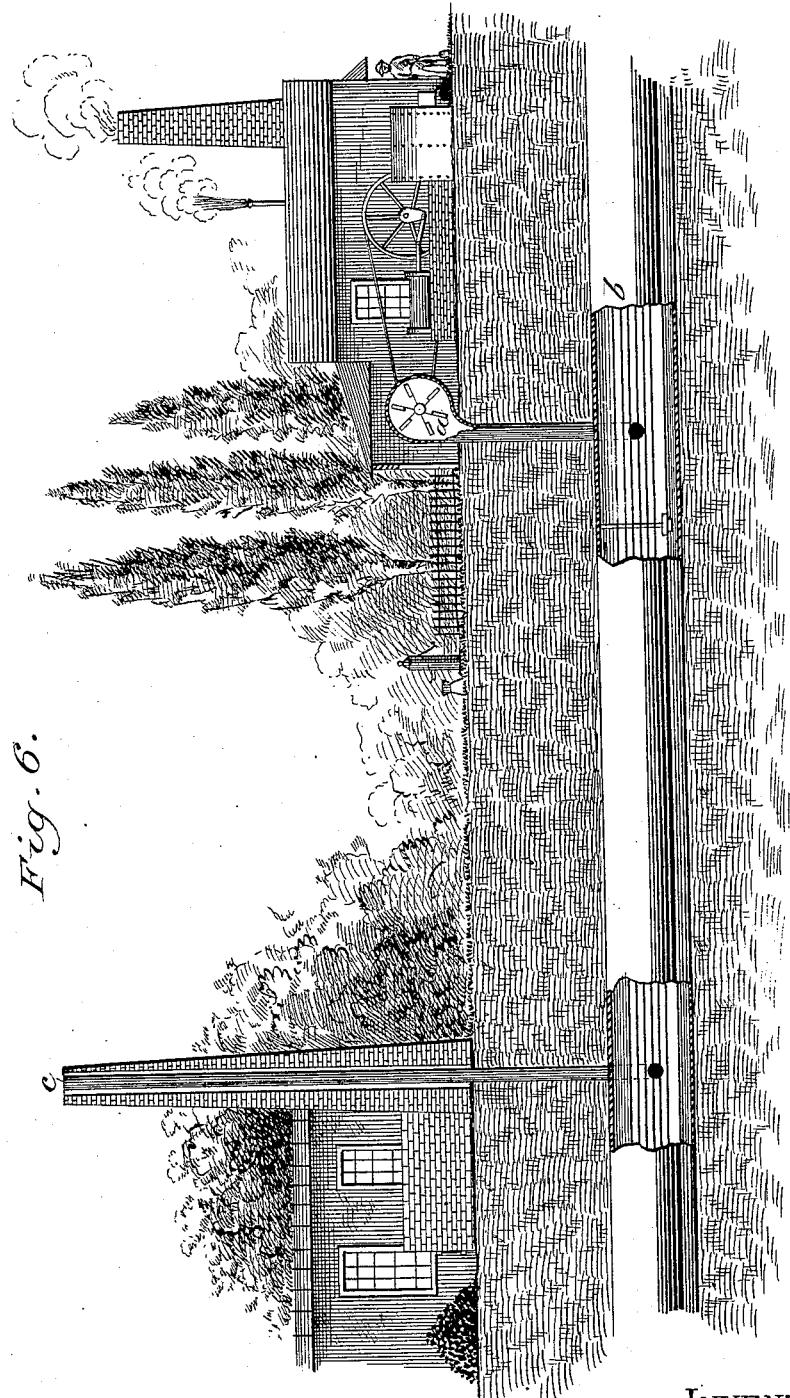

(No Model.) W. HENDLEY. 4 Sheets—Sheet 1.
CONDUIT FOR UNDERGROUND LINES FOR TELEGRAPH AND OTHER WIRES.
No. 281,064. Patented July 10, 1883.
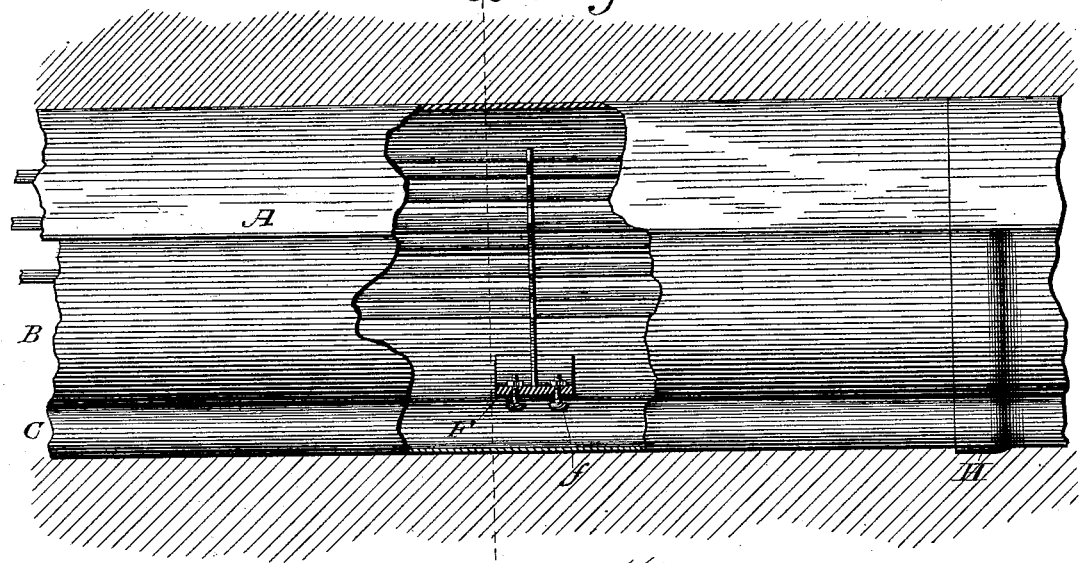
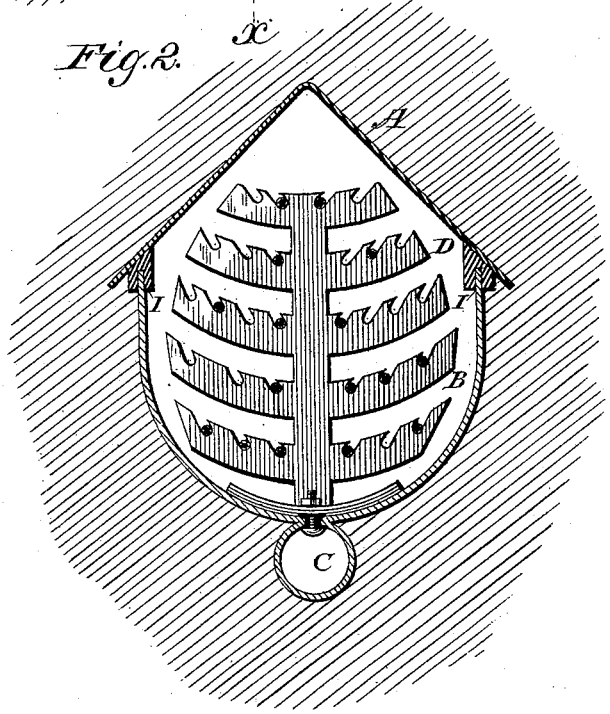

(No Model.) W. HENDLEY. 4 Sheets—Sheet 2.
CONDUIT FOR UNDERGROUND LINES FOR TELEGRAPH AND OTHER WIRES.
No. 281,064. Patented July 10, 1883.
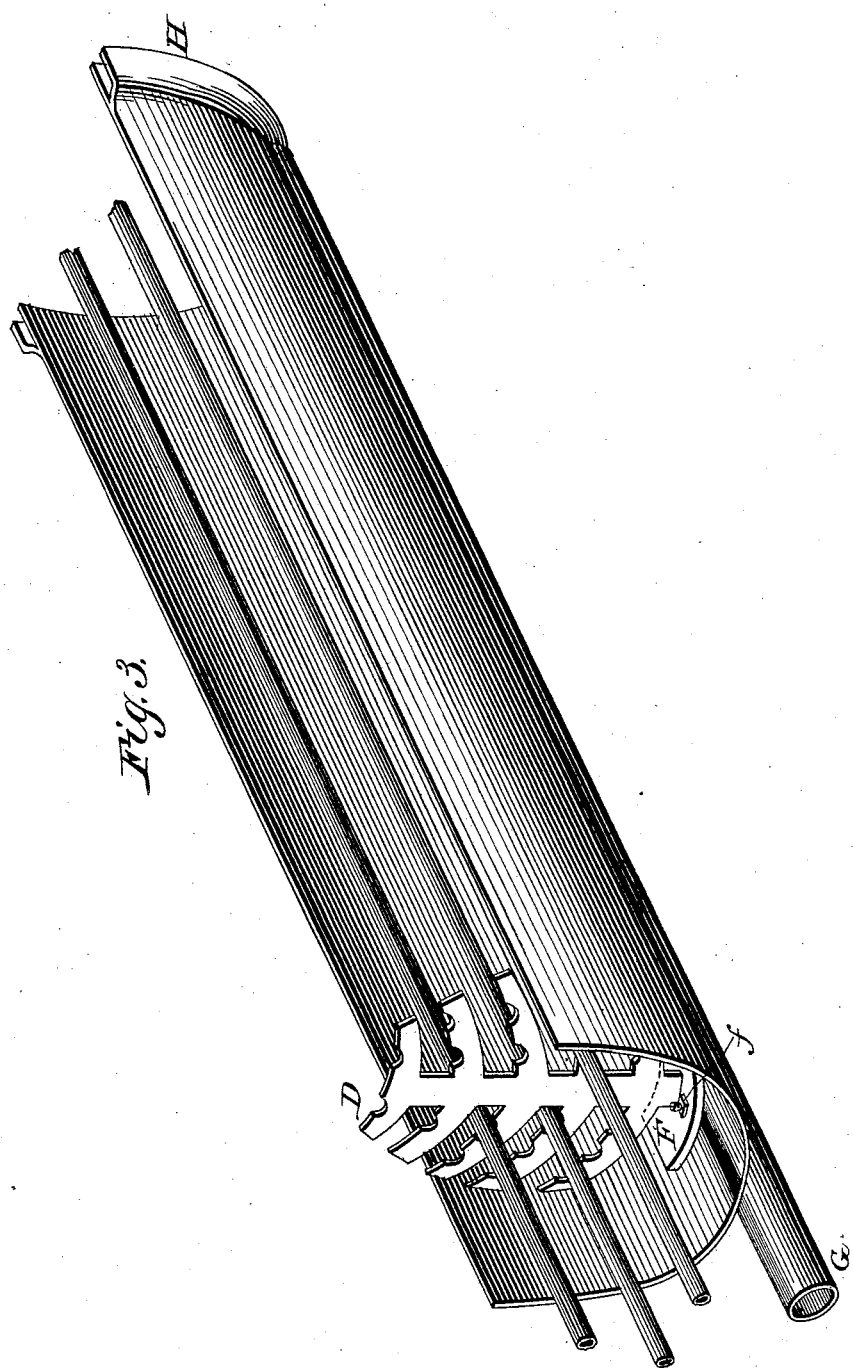

(No Model.) 4 Sheets—Sheet 3.
W. HENDLEY.
CONDUIT FOR UNDERGROUND LINES FOR TELEGRAPH AND OTHER WIRES.
No. 281,064. Patented July 10, 1883.
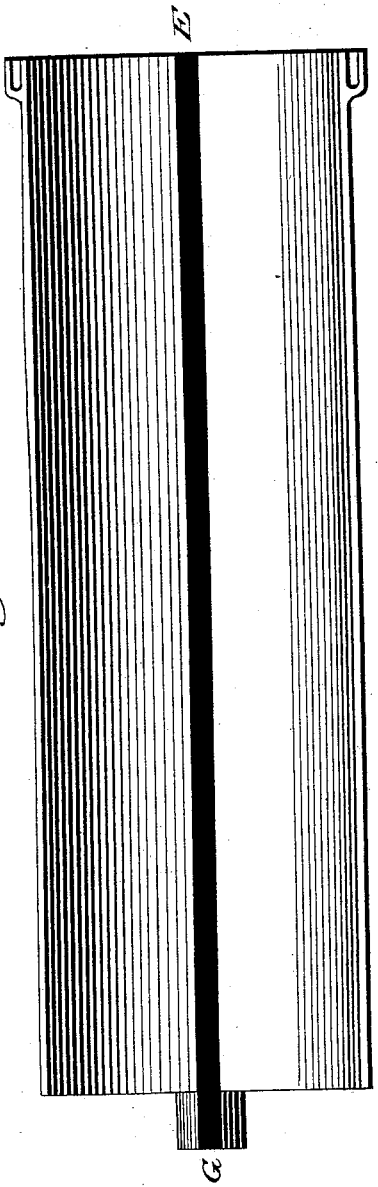
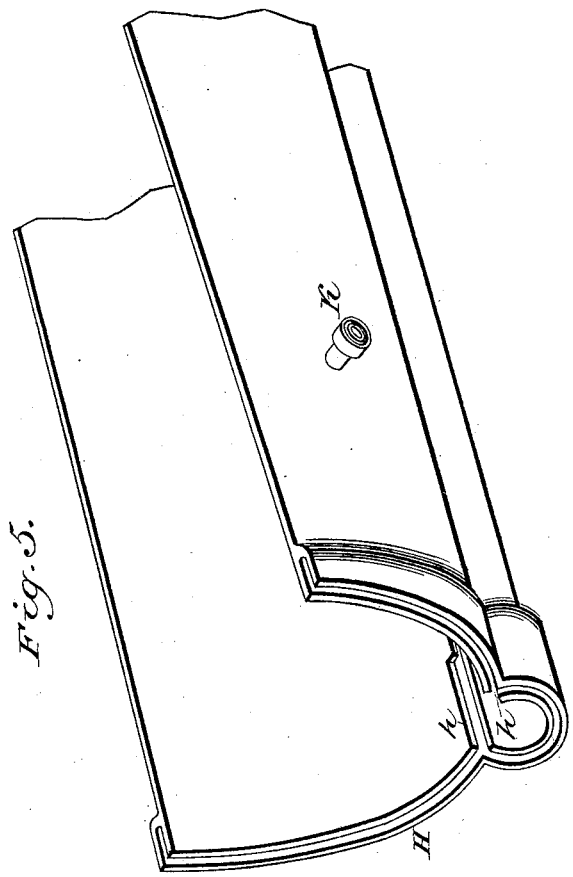
Witnesses
S. L. Talcott
D. B. Gallatin
Inventor:
W. Hendley (No Model.) W. HENDLEY. 4 Sheets—Sheet 4.
CONDUIT FOR UNDERGROUND LINES FOR TELEGRAPH AND OTHER WIRES.
No. 281,064. Patented July 10, 1883.

WITNESSES: Alex. Waddle
T. L. Talcott

INVENTOR.
W. Hendley

UNITED STATES PATENT OFFICE.

WILLIAM HENDLEY, OF WASHINGTON, DISTRICT OF COLUMBIA, ASSIGNOR TO GEORGE P. GOFF, OF SAME PLACE.

CONDUIT FOR UNDERGROUND LINES FOR TELEGRAPH AND OTHER WIRES.

SPECIFICATION forming part of Letters Patent No. 281,064, dated July 10, 1883.

Application filed November 9, 1882. (No model.)

*To all whom it may concern:*

Be it known that I, WILLIAM HENDLEY, a citizen of the United States, residing at Washington, in the District of Columbia, have invented certain new and useful Improvements in Conduits for Underground Lines for Telegraph and other Wires; and I do hereby declare the following to be a full, clear, and exact description of the invention, such as will enable others skilled in the art to which it appertains to make and use the same.

The object of my invention is to produce a conduit for wires for telegraphs, telephones, and electric lights which can be placed beneath the surface of the carriage-way or sidewalk at such a depth as to make it easily accessible for the purpose of repairing, replacing, or connecting the wires, and also to provide means for draining, drying, and ventilating the same, as will be more fully hereinafter set forth.

This invention consists, essentially, of a semicylindrical trough, at the bottom of which, and integral therewith, is formed a pipe for draining off the moisture that gathers in the conduit through a slot or opening which extends the entire length of the section of the same, and is of sufficient width to admit the easy passage of water. The trough and its drain-pipe are cast or molded in one piece, with one end of the cylindrical drain-pipe part of the conduit elongated, so as to fit snugly and securely in the next section, which is suitably flanged and recessed, as at $h\,h$, to receive it and make a continuous drain for the conduit. A standard is provided with arms or cross-bars suitably recessed and insulated for the support of the wires, and made adjustable in the longitudinal slot and throughout its entire length by means of the shoe and set-screws. The top or cover may be made to conform to the semi-cylindrical shape of the trough, or may be made angular, as shown in the drawings. This shape is deemed preferable, for the reason that when the cover is removed the wires are easily reached, and many of them are above the edge of the conduit. Flanges are formed along the side of the top or cover, recessed to fit snugly on the edges of the trough or conduit. The edges may be packed before closing, the better to exclude moisture. Means for drying and ventilating, as well as gaining access to the conduit, will be set forth in detail.

Figure 1 is a side elevation, showing through the cut away portion the wire-support and the means of adjusting and securing the same. Fig. 2 is a vertical cross-section on the line $x\,x$. Fig. 3 is a perspective view, showing the prolongation of the drain-pipe, also the slot, shoe, and standard. Fig. 4 is a plan view, showing the slot; and Fig. 5 is a detail view, showing the mode of coupling the sections. Fig. 6 is a perspective view of the conduit, showing the manner of ventilating it by means of the fan-blower and exit-pipes.

A represents the top or cover, with the grooved flanges I I, as shown in Fig. 2. B is the trough; C, the drain-pipe; D, the insulating-standard, with arms or cross-bars for the wires. E is the longitudinal slot through which the drainage takes place, and through which the set-screws pass into the shoe of the standard for the purpose of adjusting and securing the same. F is the shoe; $f\,f$, the set-screws; G, the prolongation of the pipe C. H shows the coupling-joint, and $h\,h$ are slots or recesses, through which the cylindrical prolongation G of the drain-pipe C passes in joining the section. *a* represents a fan-blower or other suitable mechanism by which hot or cold air is forced into a conduit. *b* is a section of the conduit, and *c* is the exit-pipe, which may open into a chimney-stack for the purpose of taking advantage of the available heat thereof; or it may be located at any other point and extended in the open upper air.

The conduit may be made of any suitable material, such as iron, terra-cotta, or glass, the latter being deemed the most desirable in consequence of not corroding and being cleaner, and, when the walls are of sufficient thickness, will sustain a great weight. When it is desired to place the conduit near the surface, glass, terra-cotta, or any of the material used in making pipes for analogous purposes may be used, the cover being of iron to better sustain the weight and shock of whatever is passing over it.

The standard and arms may be made of glass entirely when sufficiently stout to withstand any strain that is put upon it, or of this or any suitable insulating material on a core of iron for the purpose of giving strength.

The cover A is made to conform to the shape of the trough, that shown in the drawings being deemed the best for the reasons before stated. The grooved flanges of the cover are suitably enlarged at the joints to conform to the enlargement on the coupling ends of the trough. The top or cover is made to be coupled in the same manner as the trough. The trough is preferably semi-cylindrical in shape, so as to permit moisture that may exude through the pores, or that may in any manner find access to the interior of the conduit, to readily run down the sides and through the slot E into the pipe C. The slot or opening E extends the entire length of the trough, so as to make, when any number of sections are laid, a continuous opening through the entire length, thus securing thorough drainage, the pipe portion C being made of such diameter as may be desirable. The slot, in addition to the function before stated, serves to allow the bolts, with nuts or thumb-screws, to pass freely along its length, so that the shoe of the standard may be adjusted at any point, and as many standards may be used as may be desirable, and the wires are thus thoroughly insulated and separated from each other and sagging in such a confined space prevented.

The prolongation G of the pipe C may be made perfectly cylindrical, with the portion at the coupling-joints cut away to receive it; or the slot E may be continued the entire length of the prolongation G, enabling it to conform to the shape of the coupling-joint, as shown at H.

When the trough is being laid, such sections as may be designated to receive the standards have the heads of the bolts $f\ f$, which are loosely set in the shoe, slipped through the open end of the slot E and moved along to its proper place, and firmly secured by forcing home the nuts upon the bolts. After the trough portion is laid and the joints are suitably packed to prevent leakage, the wire being in position, packing may be applied to the flange-grooves I I to cause them to fit snugly on the upper edges of the trough portion.

Openings may be made in the trough, as shown at K, Fig. 3, for the passage of the wires above ground at any desired point, and for the purpose of ventilation. This latter is done by means of currents of air forced through the closed conduit, after the manner of pneumatic tubes used for the transmission of packages and mail matter; or the conduit may be connected with the chimney-stacks of factories and shops and the street gas-lamps, and by means of induced currents of air secure perfect ventilation. Either one of both means may be employed. I am aware that this last operation has been used in ventilating sewers and in consuming sewer-gas. Forcing hot or cold blasts of air through the conduit and in close proximity to the wires or conductors will have the effect of forcing all the heavier moisture—large drops, for instance—that may result from condensation, exudation, or leakage therein through the longitudinal slot E into the drain-pipe portion C below, while all the moisture with which the air is charged will be carried through suitable outlets—such as the chimney-stacks or street-lamps before described—and by means of the heat, from which a vacuum may be secured, while the driven current from the conduit rushes in and fills the void, and the ventilation of the conduit made more thorough and rapid than if but the one method were employed.

Man-holes or hand-holes of any desired kind are placed at proper intervals along the top or cover for the purpose of ready access to the interior of the conduit. Wires may thus be examined and much expense avoided by the readiness with which a defective wire may be located or a connection made.

Water that collects in the drain-pipe from any source is carried to small reservoirs, where it is pumped out in the same manner as is water that collects in gas-mains, though provision will be more fully made for the discharge of any water that may thus collect in a future application for a testing-chamber and means for stretching the wires.

I am aware that it is not new to place telegraph-wires in an underground conduit having downwardly-inclined projections from its sides to support the cores or cables upon.

What I claim as new, and desire to secure by Letters Patent, is—

1. In a conduit for telegraph, telephone, and electric-light wires having an angular-shaped top or cover, the combination of a semi-cylindrical trough having a longitudinal slot in the bottom thereof, which is adapted to receive and sustain the bolts or fastenings of an adjustable standard or wire-support, and which opens into a cylindrical drain-pipe which forms a part of said trough, substantially as described.

2. In a conduit for telegraph, telephone, and electric-light wires, the combination, with the angular-shaped cover having projecting eaves, and having the recessed flanges or grooves to fit on the edges of the trough, of a suitable insulating standard or support having upwardly-curving arms or bars for the support of the wires, and provided with a shoe, with set-screws, bolts, or other suitable fastenings for adjusting and securing the same in a longitudinal slot in the bottom of said conduit, substantially as described.

3. A semi-cylindrical trough or conduit having an angular-shaped cover, and having a longitudinal slot in the bottom thereof opening into a cylindrical drain-pipe integral therewith, said slot being adapted to receive and sustain the bolts or fastenings of an adjustable standard or wire-support, or a coupling prolongation of said cylindrical drain-pipe, either slotted or wholly cylindrical, to form with the next section, suitably flanged and recessed, a continuous drain for said conduit, substantially as described.

4. In a conduit for telegraph, telephone, and similar wires, a standard, with insulating arms or cross-bars to support the wires, and having a shoe in which said standard is secured, in combination with bolts and nuts or other suitable fastenings for adjusting and securing the same in a slot or recess in the bottom of said conduit, substantially as described.

5. A conduit for telegraph and similar wires having the semi-cylindrical trough B, slot E, adapted to receive and sustain the bolts or fastenings $ff$ of the shoe F, cylindrical drain-pipe C, coupling prolongation G of said cylindrical drain-pipe, said conduit having its opposite end suitably flanged and recessed, as at $h\,h$, substantially as described.

6. In a conduit for telegraph and similar wires, the combination of the semi-cylindrical trough B, longitudinal slot E, drain-pipe C, adjustable shoe F, with bolts or fastenings $ff$, standard D, coupling prolongation G, and flanged angular-shaped cover, substantially as described.

7. The joint-coupling for underground conduits for telegraph and similar wires, said conduit being semi-cylindrical in shape, and having beneath and integral therewith a cylindrical drain-pipe, into which it opens through a longitudinal slot in the bottom thereof, and having one end of a section flanged and conforming to the configuration of the vertical cross-section of said conduit to form a socket-joint, and having the cylindrical drain-pipe portion cut away or recessed horizontally at its junction with the bottom of said conduit to receive the prolonged end of the cylindrical drain-pipe part of the next section, together with an angular-shaped cover correspondingly flanged to make, when suitably packed, an air and water tight joint, substantially as described.

8. A coupling-joint for conduits, underground telegraph and similar wires, consisting of a flanged end of a section thereof, having the recesses $h\,h$, into which the cylindrical part G of the drain-pipe C passes, substantially as described.

9. The underground conduit for telegraph and other wires, consisting of the semi-cylindrical trough and flanged angular-shaped top or cover, said conduit having a longitudinal slot in the bottom thereof, which opens into a cylindrical drain-pipe below, and which is adapted to receive and sustain the bolts or other fastenings of an adjustable insulating-standard, and arms, in combination with fan-blowers or other suitable mechanism for forcing currents of hot or cold dry air through the conduit, and tube or pipe outlets opening into the upper air or into chimney-stacks for the purpose of securing a more rapid ventilation of the same, substantially as described.

In testimony whereof I affix my signature in presence of two witnesses.

WILLIAM HENDLEY.

Witnesses:
D. B. GALLATIN,
A. WADDLE, Jr.